Feb. 13, 1968   N. WEILL ET AL   3,368,932
APPARATUS FOR LAMINATING TWO FABRICS TO FOAM IN
ONE SINGLE OPERATION
Filed May 8, 1964   2 Sheets-Sheet 1
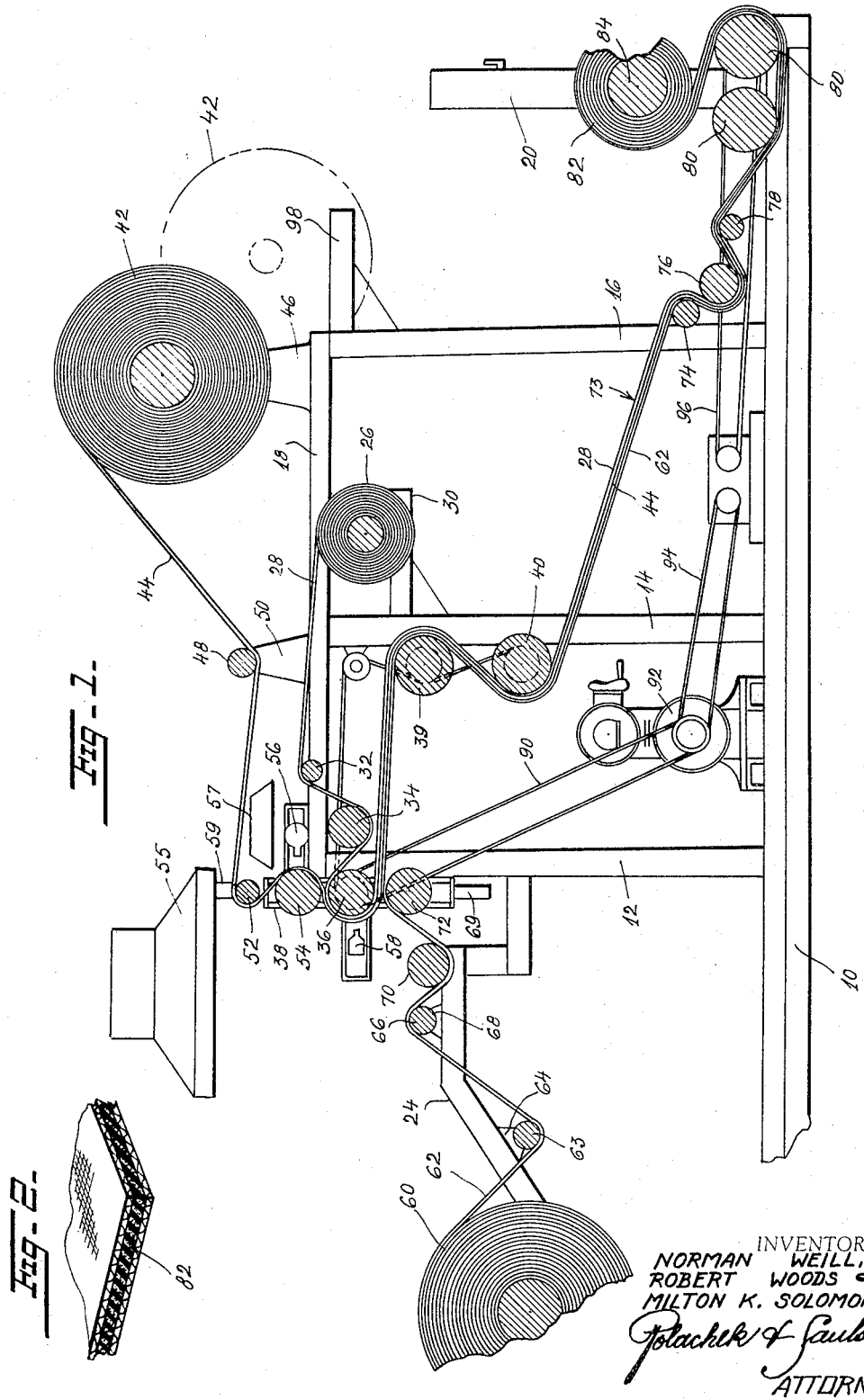
INVENTORS
NORMAN WEILL,
ROBERT WOODS &
MILTON K. SOLOMON
Polachek & Saulsbury
ATTORNEYS.

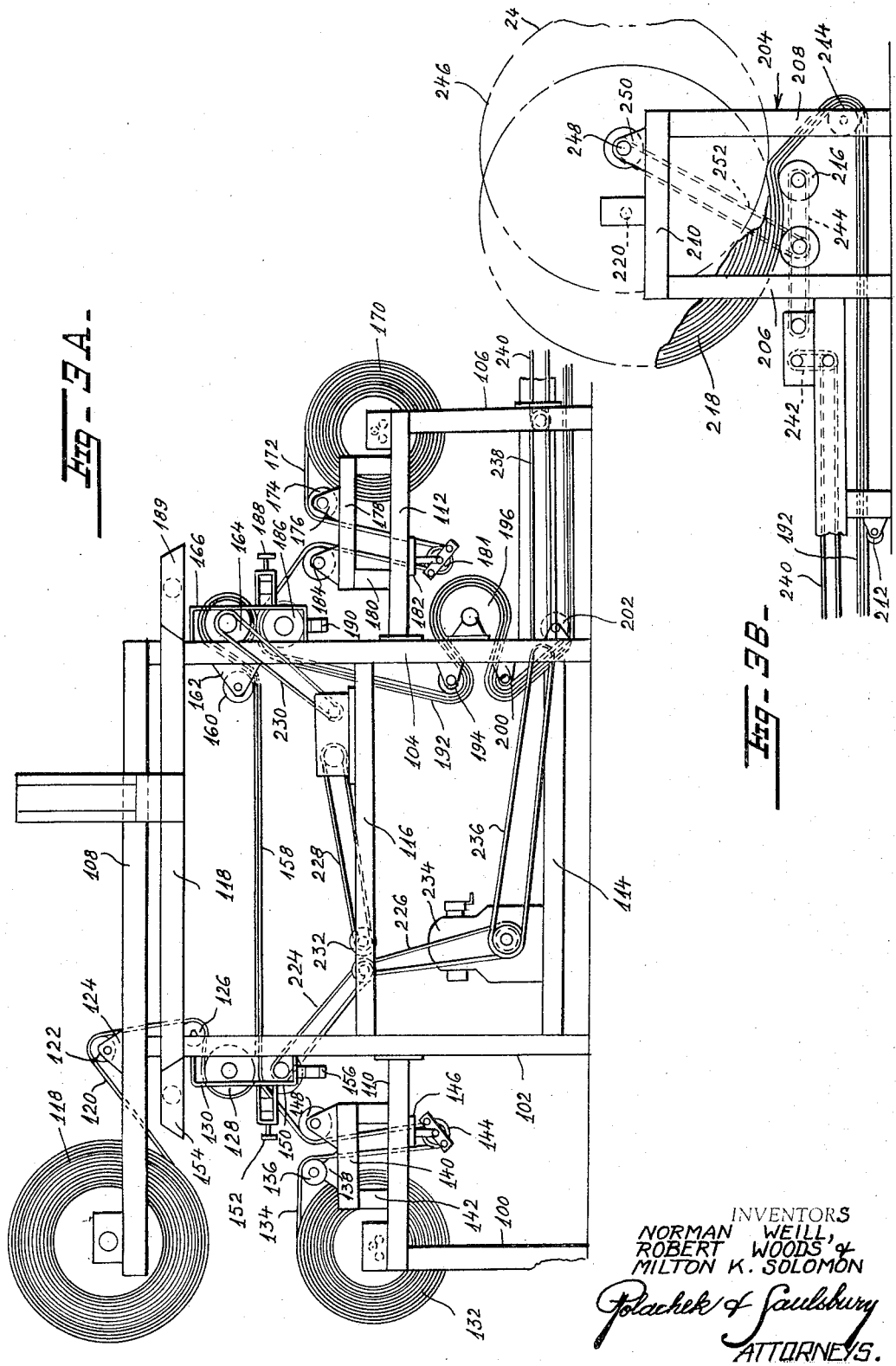

United States Patent Office 3,368,932
Patented Feb. 13, 1968

3,368,932
APPARATUS FOR LAMINATING TWO FABRICS TO FOAM IN ONE SINGLE OPERATION
Norman Weill, Rockaway Beach, N.Y. (132—17 Rockaway Beach Blvd., New York, N.Y. 11693); Robert Woods, Clifton, N.J.; and Milton K. Solomon, Rockaway Beach, N.Y. (198 Beach 133rd St., Belle Harbor, N.Y. 11693)
Filed May 8, 1964, Ser. No. 366,054
5 Claims. (Cl. 156—497)

ABSTRACT OF THE DISCLOSURE

A laminated structure composed of layer of foamed plastic sheet material and layers of sheet fabric on both surfaces thereof, the fabric layers being placed thereon when the surfaces are soft and tacky from being heated. The invention comprehends apparatus for making such structure including guide rollers for guiding the sheets of material through the apparatus, heating means for heating both surfaces of the foamed plastic sheet material and other rollers adapted to be moved into contact with the guide rollers by blasts of air.

---

This invention relates to a composite laminated structure, to a single pass laminating apparatus and to the method of forming the laminated structure.

Broadly the invention comprehends forming a laminated ester or polyether type, sometimes called plastic foam or structure having a layer of polyurethane foam of the polyfoamed plastic material. According to the invention, we propose to bind a first layer of polyurethane foam plastic material of the polyester or polyether type, with top and bottom layers of fabric, of all types including vinyl, canvas, paper, etc. by fusing the top and bottom surfaces of the first layer and then applying the top and bottom fabric layers to said fused surfaces. The surfaces of the first layer are rendered soft and tacky with the application of heat and the top and bottom fabric layers are applied thereto while the surfaces of the first layer are soft and tacky.

The top and bottom fabric layers are applied after the first plastic foam layer has been removed from the heat source and the surface temperature has cooled below the fusion temperature of the plastic foam material so that the surface portion of the plastic foam material is in a so-called super-cooled state, that is, in a tacky liquid state at a temperature below the freezing or fusion temperature of the plastic foam material and the top and bottom fabric layers of material may be applied without being scorched, or otherwise damaged where this is of importance.

A principal object of the present invention is to provide an improved structure of adhered material, one of which is polyurethane foam of the polyester or polyether type, and the method of forming same according to which heat is applied to the plastic foam material to fuse the surface thereof and other materials for the structure are applied to said fused surface causing the materials to adhere one to the other.

Another object of the invention is to provide a method of forming a laminated structure according to which layers of material may be applied upon opposed fused surfaces of a foamed plastic layer of material without damage to the layers which are applied.

A further object is to provide a simple and efficient method subject to continuous operation for forming a laminated structure in the described manner.

Still another object is to provide a single pass laminating apparatus that is readily convertible from a three-ply let-off device to a two-ply let-off device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a diagrammatic illustration of apparatus for carrying out the process of the invention.

FIG. 2 is a perspective view showing a portion of the laminated structure formed in accordance with the invention.

FIG. 3A is a view similar to FIG. 1 of apparatus embodying a modification of the invention.

FIG. 3B is a similar view showing the remainder of the apparatus.

Referring now in detail to the drawings, in FIG. 1 there is illustrated apparatus for carrying out the process of the invention to form a laminated structure comprising a layer of polyurethane foamed plastic material of the polyester type and layers of fabric or other comparable material. The apparatus includes a frame having a base 10, spaced upright posts 12, 14, 16 supporting a top beam 18. Another upright post 20 is positioned at one end of the base and is shorter than the upright posts 12, 14 and 16. An angular bracket 24 extends laterally of upright post 12 adjacent the top thereof.

A supply roll 26 of fabric sheet material 28 is supported on a bracket 30 fixed on upright post 14 at the top thereof. Material from roll 26 is drawn over a spiral roll 32 on top beam 18 and downwardly under and around an expander roll 34 and thence over and around a water-cooled roller 36 slidably supported in a vertical frame 38 mounted on upright post 12, at the top thereof, the material passing from right to left as viewed in the drawing. From roller 36, the material passes in the opposite direction, to wit, from left to right, and passes over cooling rollers 39 and 40, on post 14.

A supply roll 42 of sheet polyurethane foamed plastic material 44 is supported on an upright post 46 on the top of the beam 18, at one end thereof. Material from roll 42 is drawn under an idler 48 supported on an upright post 50 on top beam 18 and then passes over a spiral roll 52 above the other end of the top beam 18, the material passing from right to left as viewed in the drawing. From the roll 52, the material passes downwardly around a water-cooled roller 54 slidably supported in the vertical frame 38 at the top thereof. When the material passes around roller 54, the surface of the material outwardly of the roller is heated by a burner 56 supported on top beam 18 adjacent roller 54. As the foamed material 44 passes the burner 56 the surface of the material is caused to assume a soft and tacky condition. Only a superficial heating rendering the surface soft and tacky without altering the structure of the remainder of the material is desired. The requisite degree of heating may be obtained by properly regulating the speed with which the material is moved across the burner. Further provision may be made for controlling the heat supplied to the moving sheet of material by having the heater adjustable in distance laterally of the material. As shown, a hood 57 is provided over the burner 56 for exhausting any gases resulting from the melting of the sheet material. From roller 54, the material passes downwardly and around roller 36 over the material 28. When the material 44 passes under roller 54 and over roller 36, a blast of air forced downwardly through air cylinder 59 against roller 54 presses roller 54 against roller 36 and thereby joins the material 44 to the material 28. The air comes from any suitable air supply. When the material 44 passes around roller 36, the opposite surface thereof is heated by a burner 58 supported on the opposite side of frame 38. The cooler roller 36 prevents the first-heated surface of the material 44 from becoming overheated. From roller 36 the material 44, heated on both surfaces thereof, passes from left to right as viewed in the drawing and over cooling rollers 39 and 40 together with material 28. A hood 55 is provided over heater 58 for exhausting any gases resulting from the melting of the sheet material.

A second supply roll 60 of fabric sheet material 62 is supported on the outer end of bracket 24 fixed on post 12. Material from roll 60 is drawn under an idler 63 supported on a bracket 64 depending from bracket 24 thence over an idler 66 on a bracket 68 on bracket 24 and thence under an expander roll 70 on top of the bracket 24 and thence over a roller 72 slidably supported on frame 38 underneath roller 36, the material passing from left to right as viewed in the drawing. When the material 62 passes over roller 72, a blast of air from air cylinder 69 against roller 72 presses roller 72 against roller 36 thereby joining the material 62 to the material 44 while the foamed plastic surface is still soft and tacky causing the fabric material 62 to adhere to the foamed plastic material, thereby forming a three-ply laminated structure 73. The air comes from any suitable source of air supply. The fabric material 62 is not scorched when applied under roller 36 to the heated surface of the foamed plastic material 44. The fusion temperature of polyurethane foamed plastic material is about 450° F. so that it is necessary to heat the surface of the foamed plastic sheet material 44 to at least this temperature. Such fusion temperature is considerably above the temperature at which the fabric will scorch. The fused surface portion of the polyurethane foamed plastic material, however, has the characteristics of readily assuming a cooled state in which the temperature of the fused material is below the fusion temperature although the material is nevertheless soft and tacky.

In accordance with the invention, the fabric 28 and 62 are applied to the material 44 when the surface of such material is in a cooled state with the temperature below the scorching temperature of the fabric. The roller 36 is disposed with respect to the burner 58 to allow the surface of the material 44 to assume such cooled condition after moving away from the burner. Such a cooled state at the surface of the material 44 is achieved in a very short period of time so that the roller 36 may be located in close proximity to the burner 58.

After the fabric materials 28 and 62 have been rolled onto the foamed plastic material 44 causing the fabric materials to adhere to the plastic material 44, the resulting laminated structure is transported to a pair of cooling rollers 39 and 40, and thence over an idler 74 on post 16 adjacent the bottom end thereof and thence under an expander roller 76 supported on the base 10, over an idler 78 on the base and thence to and over a pair of rewind rollers 80, 80 and finally to the finished roll 82 of three-ply laminated structure supported on beam 84 on post 20. The cooling rollers 39 and 40 serve to reform the polyurethane material so that it is completely cooled and set so that the finished laminated structure has the proper thickness and stability. A portion of the three-ply laminated structure 82 made in accordance with the invention is shown in FIG. 2.

In operation, the sheets 28, 44 and 62 are driven through the apparatus by means of the roller 36 which is turned by a chain 90 driven by an engine 92 on the base 10. Chains 94 and 96, operatively connected to the engine, drive the rewind rollers 80, 80.

While the roll 42 of foamed plastic material 44 is shown supported on the bracket 46 for three-ply let-off, in order to convert the apparatus to two-ply let-off it is only necessary to mount the roll 42 on a bracket 98 mounted on the post 16 substantially level with the top beam 18.

Referring now to the form of the invention shown in FIGS. 3A and 3B, herein the apparatus includes a frame having spaced upright posts 100, 102, 104, 106, the posts 102 and 104 supporting a top cross beam 108, the posts 100 and 106 supporting horizontal beams 110 and 112, respectively. Horizontal beams 114 and 116 brace the posts 102 and 104. Another beam 118 is supported across the beams 102 and 104 adjacent the top thereof and closely spaced under the top beam 108.

A supply roll 118 of fabric sheet material 120 is supported on one end of top beam 108. Material from roll 118 is drawn over a roller 122 on bracket 124 on beam 108 and downwardly around an expander roll 126 on post 102 and downward around a water-cooled roller 128 supported on a vertical frame 130 mounted on upright post 102.

A supply roll 132 of sheet polyurethane foamed plastic material 134 is supported on the outer free end of beam 110. Material from roll 132 is drawn over a roller 136 on a bracket 138 mounted on a shelf 140 supported on blocks 142 upstanding from beam 110. From roller 136 the material passes downwardly around a roller 144 supported on a depending bracket 146 on the beam 110, thence passes upwardly around a roller 148 on a bracket on shelf 140 thence upwardly and laterally around a water-cooled roller 150 slidably supported on the vertical frame 130. When the material 134 passes around roller 150, the surface of the material outwardly of the roller is heated by a burner 152 supported on the frame 130. As the foam material 134 passes the burner 152 the surface of the material is caused to assume a soft and tacky condition. Only a superficial heating rendering the surface soft and tacky without altering the structure of the remainder of the material is desired. A hood 154 is provided over the burner 152 for exhausting any gases resulting from the melting of the sheet material.

When the material 134 passes over roller 150, a blast of air from air cylinder 156 against roller 150 presses roller 150 against roller 128 thereby joining the material 134 to one surface of the material 120 while the foamed plastic surface is still soft and tacky causing the fabric material 120 to adhere to the foamed plastic material thereby forming a two-ply laminated structure 158. The laminated structure 158 passes from rollers 128 and 150 horizontally from left to right as shown in FIG. 3A to and over an idler 160 on a bracket 162 on upright post 104 and thence around a water-cooled roller 164 supported on a vertical frame 166 mounted on upright post 104 adjacent the top thereof.

A second supply roll 170 of sheet polyurethane foamed plastic material 172 is supported on the top of the outer end of beam 112. Material from roll 170 is drawn over a roller 174 on a bracket 176 mounted on a shelf 178 supported on blocks 180 upstanding from the shelf 178. From roller 174 the material passes around a roller 181 supported on a depending bracket 182 on the beam 112, thence passes upwardly around a roller 184 on a bracket on shelf 178, thence upwardly and laterally around a water-cooled roller 186 slidably supported on the vertical frame 166. When the material passes around roller 186, the surface of the material outwardly of the roller is heated by a burner 188 supported on the frame 166. A hood 189 is provided over burner 188. When the material passes over roller 186, a blast of air from air cylinder 190 against roller 186 presses roller 186 against roller 164 thereby joining the material 172 to the opposite surface of the fabric material 120 while the foamed plastic material is still soft and tacky causing the fabric material 120 to adhere to the foamed plastic material 172 thereby forming a three-ply laminated structure 192. The laminated structure 192 is transported over an idler 194 to a cooling roller 196 on a bracket on post 104 and thence over another idler 200 on post 104 adjacent the bottom thereof and over another idler 202 at the bottom of post 104 and thence horizontally from left to right as viewed in FIGS. 3A and 3B to a frame 204 composed of a pair of upright posts 206 and 208, supporting a cross beam 210. On the way to the frame 204, the laminated structure passes over an idler 212 and thence over an idler 214 on post 208 and thence over a rewind roller 216 and finally to the finished roll 218 of three-ply laminated structure supported on beam 220 supported on beam 210.

In operation, the sheets 120, 134 and 172 are driven through the apparatus by means of the rollers 128 and 164 which are turned by chains 224, 226, 228, 230 operatively connected by gearing 232 to an engine 234 mounted on beam 114. Chains 236, 238, 240, 242, 244 operatively connected to the engine drive the rewind roller 216.

Another phantom finished roll 246 is shown mounted on a beam 248 supported in a bracket 250 on the beam 210 adapted to be operatively connected to the engine drive by means of a chain 252.

While we have illustrated and described the preferred embodiments of our invention, it is to be understood that we do not limit ourselves to the precise construction herein disclosed and that various changes and modifications may be made with the scope of the invention as defined in the appended claims.

Having thus described our invention, what we claim as new, and desire to secure by United States Letters Patent is:

1. Apparatus for forming a laminated construction comprising, in combination, a frame, top, bottom and intermediate laminating rollers slidably mounted in vertical superimposed position, a roll of polyurethane foamed plastic sheet material supported on the frame, a spiral roller above and in line with said laminating rollers for guiding said polyurethane foamed plastic sheet material downward and around said top and intermediate rollers, a heater adjacent the top roller at one side thereof for heating one surface of the sheet of foamed material, a heater adjacent the intermediate roller at the other side thereof for heating the other surface of said sheet of foamed plastic material, a first roll of fabric sheet material supported on the frame, an expander roller laterally of and adjacent to the intermediate roller for guiding said sheet of fabric material around said intermediate roller, means for supplying a blast of air against the top roller to move said top roller against the intermediate roller for joining the sheet of fabric material to the sheet of foamed plastic material on one surface thereof, a second roll of fabric sheet material supported on the frame, an expander roller adjacent the bottom laminating roller, for guiding said latter sheet of fabric material over the bottom laminating roller, and means for supplying a blast of air against the bottom roller to move said bottom roller against the intermediate roller for joining the last-named sheet of fabric material to the other surface of the sheet of foamed plastic material, and means for moving said top, intermediate and bottom rollers whereby said sheets are moved through the apparatus.

2. Apparatus for forming a laminated construction as defined in claim 1, wherein the means for supplying a blast of air against the top roller includes an air cylinder above the spiral roller and in line with the top roller and means for supplying air to said cylinder.

3. Apparatus for forming a laminated construction as defined in claim 1, wherein the means for supplying a blast of air against the bottom roller includes an air cylinder below the bottom roller and in line therewith and means for supplying air to said latter air cylinder.

4. Apparatus for forming a laminated construction comprising, in combination, a frame with spaced upright posts, a roll of polyurethane sheet material supported on one of said posts, a pair of opposed rollers on one of said posts, another pair of opposed rollers on the other of said posts, one roller of each pair being movable relative to the other roller of the pair, a roll of polyurethane foamed plastic sheet material supported on another of said posts, an idler closely spaced from each pair of rollers, one of said idlers adapted to guide said polyurethane foamed plastic material upwardly and around the movable roller of each pair of rollers, a roll of sheet fabric material supported on a third of said posts, another idler closely spaced from the stationary roller of one pair of rollers, said other idler adapted to guide a sheet of fabric material downwardly around said stationary roller, a heater adjacent each movable roller of the pairs of rollers, means for supplying a blast of air against each movable roller, to move said movable roller against the stationary roller of the pair of rollers, whereby the one sheet of foamed plastic material is joined to one surface of the fabric sheet and whereby the other sheet of foamed plastic sheet material is joined to the opposite surface of the fabric sheet, and means for rotating one roller of each pair of rollers whereby the sheet material is moved through the apparatus.

5. Apparatus for forming a laminated construction as defined in claim 4, wherein the means for supplying a blast of air against the movable roller includes an air cylinder below the movable roller and in line therewith and means for supplying air to said latter air cylinder.

References Cited

UNITED STATES PATENTS

| | | | |
|---|---|---|---|
| 2,434,541 | 1/1948 | Bierer | 156—322 |
| 3,210,227 | 10/1965 | Shichman | 156—82 |
| 3,239,399 | 3/1966 | King | 156—82 |
| 3,257,263 | 6/1966 | Miller | 161—119 |

FOREIGN PATENTS 813,311  5/1959  Great Britain.

MORRIS SUSSMAN, *Primary Examiner.*